United States Patent [19]

Farmer et al.

[11] Patent Number: 5,071,903

[45] Date of Patent: Dec. 10, 1991

[54] EMULSION POLYMERIZATION

[75] Inventors: David B. Farmer, Dorking, England; Abdol M. Vafa, Rotterdam, Netherlands

[73] Assignee: Unilever Patent Holdings B.V., Rotterdam, Netherlands

[21] Appl. No.: 657,374

[22] Filed: Feb. 19, 1991

Related U.S. Application Data

[63] Continuation of Ser. No. 263,168, Oct. 27, 1988, abandoned.

[30] Foreign Application Priority Data

Oct. 27, 1987 [GB] United Kingdom ............... 8725131

[51] Int. Cl.$^5$ ................................................ C08F 2/16
[52] U.S. Cl. ................................. 524/458; 524/832; 524/833
[58] Field of Search ............... 524/832, 459, 457, 458, 524/833

[56] References Cited

U.S. PATENT DOCUMENTS

| | | | |
|---|---|---|---|
| 4,022,744 | 5/1977 | D'Achille et al. | 524/832 |
| 4,395,499 | 7/1983 | Rosenski et al. | 524/53 |
| 4,529,762 | 7/1985 | Hoefer et al. | 524/157 |
| 4,609,704 | 9/1986 | Hausman et al. | 524/710 |
| 4,657,999 | 4/1987 | Hoefer et al. | 524/200 |
| 4,739,004 | 4/1988 | Sekmakas et al. | 524/832 |

FOREIGN PATENT DOCUMENTS

| | | |
|---|---|---|
| 885604 | 12/1961 | United Kingdom . |
| 993469 | 5/1965 | United Kingdom . |
| 1012361 | 12/1965 | United Kingdom . |
| 1148060 | 4/1969 | United Kingdom . |
| 1220937 | 1/1971 | United Kingdom . |
| 1440768 | 6/1976 | United Kingdom . |
| 2125420 | 5/1986 | United Kingdom . |

Primary Examiner—Joseph L. Schofer
Assistant Examiner—Jeffrey T. Smith
Attorney, Agent, or Firm—Cushman, Darby & Cushman

[57] ABSTRACT

The invention provides a copolymer emulsion latex having a solids content from about 20% to about 70%, preferably 40% to 60%, wherein a vinyl ester of an alkanoic acid having 1 to 13 carbon atoms forms at least about 40% by weight of the monomer charge characterized in that the polymerization is performed in the presence of an effective amount of stabilizing system comprising:

A) at least one surfactant as defined hereinafter capable of providing sharp nucleation in the polymerization process and B) at least one surfactant including $C_{14}$ to $C_{20}$ alkenylene moiety.

7 Claims, No Drawings

EMULSION POLYMERIZATION

This is a continuation of application Ser. No. 07/263,168, filed on Oct. 27, 1988, which was abandoned.

FIELD OF THE INVENTION

This invention relates to aqueous emulsions containing copolymers in which vinyl acetate is the major component. Copolymers of the invention are utilised in paper coating compositions and demonstrate particularly good rheology and enhanced dry pick strength.

BACKGROUND OF THE INVENTION

Paper coating compositions usually comprise an aqueous polymer binder emulsion, a pigment and optionally other additives common in the technology. The present invention is specifically directed to novel copolymers comprising a vinyl C1 to C13 alkanoate component i.e. forming at least about 40% by weight of the copolymer more usually at least about 50% by weight. Vinyl acetate is an example of a vinyl ester of a C1 to C13 alkanoic acid to which the invention is generally directed. Coating compositions of the invention will contain a pigment, for example clay, which is compounded with the latex binder and used in coating a cellulosic web for example a paper or paperboard web. The characteristics of the latex binder component are significant in the ease of preparation of the paper coating composition, its application and on the qualities of the coated product.

In particular the flow characteristics of the liquid coating composition are crucial in the industrial application to the paper or board and, when dried, the latex particles confer adequate strength to the surface for subsequent processing.

GENERAL DESCRIPTION OF THE INVENTION

The invention provides a copolymer emulsion latex having a solids content from about 20% to about 70%, preferably 40% to 60%, wherein a vinyl ester of an alkanoic acid having one to thirteen carbon atoms forms at least about 40% by weight of the monomer charge characterised in that the polymerisation is performed in the presence of an effective amount of a stabilising system comprising:

A) at least one surfactant as defined hereafter capable of providing sharp nucleation in the polymerisation process and
B) at least one surfactant including C14 to C20 alkenylene moiety The product of this process has good rheology and enhanced dry pick strength and these desirable product attributes follow from the stabilising surfactant system.

In the emulsions prepared for use in paper coatings the polymerisation system will be substantially free of protective colloids. Colloidal materials may be added subsequently to the paper coating composition.

Preferably the stabilising surfactant system is present in an amount of from about 1% to about 10% by weight, more preferably from 2% to 8%, relative to the copolymerisable monomers. Preferably the surfactants A and B are present in a weight ratio of from 5:1 to 1:5.

It is believed the presence of surfactant A provides a reduced particle size for the emulsion particles and hence increases the surface area of the binder latex.

The surfactant system is applicable to vinyl acetate homopolymers and vinylacetate/acrylates.

Although vinyl acetate is the preferred vinyl alkanoate monomer because of its availability, cost and known reactivity, other vinyl esters within the class defined are usable in particular vinyl formate, propionate, butyrate, isobutyrate, valerate, 2-ethyl hexanoate, isooctanoate, nonanoate, decanoate, pivalate and versatate.

A preferred comonomer is ethylene but other ethylenic hydrocarbons, for example propylene, butylene and isobutene and higher alpha-olefins, are usable. Alkyl acrylates are also preferred comonomers.

Optionally the copolymer may contain minor monomer components added to provide specific benefits, examples are sodium vinyl sulphonate, acrylic acid, methacrylic acid, acrylamide, hydroxy functional acrylates, vinyl silanes and vinyl halides. A favoured comonomer is a polyethylencially unsaturated compound selected from triallyl cyanurate, triallyl isocyanurate, diallyl maleate, diallyl fumarate, divinyl benzene and diaklyl phthalate.

Methods for preparing the copolymer emulsions of the invention are well characterised in the literature. Polymer Synthesis (vols I and III) by Sandler & Karo (Academic Press 1974) and Preparative Methods of Polymer Chemistry (2nd Ed) by Sorenson and Campbell (Interscience 1968) provide preparative information. Methoden der Organischen Chemie (Houben-Wey) Band XIV published by George Thieme Verlag Stuttgart (1961) also provides preparative descriptions.

The specific stabilising system to which the invention is directed comprises two surfactants. Surfactant A is capable of providing sharp nucleation in the polymerisation process. The term "sharp nucleation" is defined in Test Method (iii) below. One example of a suitable surfactant is obtainable from Cyanamid of USA under the trade name Aerosol A102 described as the disodium salt of an ethoxylated alcohol half ester of sulphosuccinic acid.

Surfactant B is required to contain a C14 to C20 alkylene moiety and examples are an oleyl propanol amide sulphosuccinate obtainable from Witco of USA under the trade name Emcol K8300 and the potassium salt of the sulphonation product of oleic acid obtainable from Lankro Chemicals of Manchester England under the trade name Lankropol OPA.

The paper coating composition comprises a pigment, for example clays, hydrated silica clays, and other conventional ingredients.

The clays used include Kaolin group clays and hydrated silica clays, specific clays are disclosed in "kaolin Clays and their Industrial Uses" by J. M. Huber Corp. (1949) New York chapters 10 to 16.

Other pigments, for example calcium carbonate, titanium dioxide, blanch fixed, lithopone and zinc sulphide may be used in addition to clay. In general the paper coating composition will comprise

| Component | Parts |
| --- | --- |
| Pigment | 100 |
| dispersing agent eg. sodium pyrophosphate | 0.1 to 0.5 |
| latex (on solids basis) | 3 to 30 |
| Cobinder eg. starch or casein | 0 to 25 |
| Defoamer, eg. a hydrocarbon oil | 0 to 0.2 |
| Water to provide desired solids level. | |

The coating compositions produced with the aid of the latexes of the invention will be applied to fibrous paper webs using conventional means for example trailing blade coaters, air knife coaters and roll coaters.

Test Methods i) Dry pick strength values (cm/sec) were measured on Reeds Aircoat woodfree paper using an IGT Dynamic Pick Tester (AC2 Model) with 25 Kg load and low viscosity ink.

ii) Viscosity measurements used either a Brookfield Viscometer at 25° C. or a Carrimed Rheometer under the conditions of

| | |
|---|---|
| temperature | 25° C. |
| Ascent time | 1 min. |
| Hold time | None |
| Descent time | 1 min. |
| Max. shear stress | 1500 dynes/sq. cm. |
| Cone diameter | 4 cm. |
| Cone Angle | 1.5° C. | iii) The identification and definition of a sharp nucleation surfactant A is obtained by means of the following test method.

A vinyl acetate homopolymer is formed by polymerising at 60° C. a composition comprising the components

| Component | Weight (g) |
|---|---|
| Vinyl Acetate | 120 |
| Test surfactant | 6 |
| Sodium bicarbonate | 1.2 |
| Sodium persulphate | 0.6 |
| Water | 1072.2 |
| Total | 1200.0 |

Samples of the reaction medium were taken during the initial stages of the polymerisation. The non volatiles content of each sample was measured and the time to provide 15% conversion from the onset of nucleation was calculated. A sharp nucleation surfactant is one providing a period of below 5 minutes, preferably below 4 minutes, to achieve 15% conversion. Results of surfactants tested are:

| Surfactant | | Period (mins) |
|---|---|---|
| Aerosol A102 | | 3.35 |
| Perlankrol RN75 | | 3.1 |
| Empicol LXV | | 4.2 |
| Perlankrol PA | | 4.4 |
| Arylan SC15 | | 6.6 |
| Lankropol OPA | | 13.0 |
| Emcol K8300 | above | 30.0 |
| Perlankrol P208 | | 26.3 |

The compositions and commercial sources of Aerosol A102 and Emcol K8300 have been given previously. Perlankrol PA is ammonium nonylphenol 4EQ sulphate and Perlankrol RN75 sodium nonylphenol 20EO sulphate; they are obtainable from Lankro Chemicals of Manchester. Empicol LXV is sodium dodecyl sulphate obtainable from Albright and Wilson of Whitehaven, England.

Arylan SC15 is sodium dodecyl benzene sulphonate and Perlankrol P208 is nonyl phenol 20EO; both are obtainable from Lankro Chemicals.

The first four listed surfactants satisfy the definition of a sharp nucleation surfactant.

SPECIFIC DESCRIPTION OF THE INVENTION

Examples of the invention will now be given to illustrate but not limit the invention.

EXAMPLE I

This example describes the preparation and use of a copolymer latex having the composition by weight of:

| | Weight (Kg) | % |
|---|---|---|
| vinyl acetate | 3280 | 76.9% |
| ethylene | 890 | 20.9% |
| sodium vinyl sulphonate | 44.5 | 1.0% |
| vinyl tris methoxyethoxy silane* | 44.5 | 1.0% |
| diallyl maleate | 8.9 | 0.2% |

*obtainable from Union Carbide of USA under the code number A172.

A surfactant solution comprising a 37% aq solution of Emcol K8300 (276Kg), 30% aq solution of Aersol A102 (178Kg), 25% aq. solution of sodium vinyl sulphonate (178Kg) dissolved in water (2.5 tonnes) was prepared and added to a 8.5 tonnes pressure vessel including an agitator. The pH of this solution was in the range 5.0 to 6.5.

A solution of ammonium persulphate (30Kg) in water (160Kg) was prepared and 45% of this solution pumped to the stirred reactor.

The temperature was adjusted to 75° C. while 10% of the three liquid monomers was added and the vessel pressurised with ethylene to 62 bar. The temperature was held at 75° C. for 45 minutes and ethylene added to maintain the pressure of 62 bar. Water (400 Kg) was added to the remainder of the persulphate solution during the period. The pressure was maintained at 62 bar until the desired quantity of ethylene had been reacted; this was after 3.5 hours. A period which had previosuly been identified to allow the desired quantity of ethylene to react.

After the 45 minute period the persulphate solution was added continously over a 7 hour period and the remainder (90%) of the monomer mix added over 6 hours. Both additions were made at a constant rate.

After completion of all additions the reaction mass was held at 75° C. for 30 minutes and the contents of the vessel then cooled to 40° C and discharged to a degassing vessel where finishing solutions A, B comprising:

| | Kg |
|---|---|
| A | |
| t-butyl hydroperoxide | 13.3 |
| Synperonic NP30 (70% aq)** | 31.6 |
| Water | 180 |
| B | |
| Sodium metabisulphite | 13.3 |
| Water | 180 |

**Nonylphenol 30EC obtainable from ICI Limited of Wilton, England.

were added in separate streams.

Ammonia solution was added, if required, to bring the pH of the emulsion latex into the range 8.0 to 9.0 together with a small quantity of preservative. The emulsion had a solids content of 54%. A paper coating composition was formulated containing 12 parts per hundred binder on clay (dry/dry) with a final solids content of 45%; this was subjected to the dry pick test.

Rheological measurements with the Carrimed Rheometer were performed with a coating composition at 4 parts per hundred binder on clay (dry/dry) with a final solids content of 64.5%. A Comparison emulsion was also prepared in which EMCOL K8300 was replaced by the Aerosol surfactant on a weight for weight basis and formulated into a Comparison composition.

The dry pick test (procedure i) gave a result of 250 cm/sec; this is a commercially attractive value.

The rheology of the binder composition of Example I and the Comparison composition which did not contain surfactant B was studied; the results were:

| Ascent Time (mins × 10²) | Example I Composition | | Comparison Composition | |
|---|---|---|---|---|
| | Shear rate sec⁻¹ | Viscosity poise | Shear rate sec⁻¹ | Viscosity poise |
| 10 | 45.85 | 3.579 | 65.19 | 2.517 |
| 19 | 112.7 | 2.648 | 121.8 | 2.450 |
| 28 | 199.2 | 2.173 | 170.2 | 2.542 |
| 37 | 308.0 | 1.841 | 201.8 | 2.810 |
| 46 | 441.0 | 1.590 | 213.6 | 3.283 |
| 55 | 591.0 | 1.414 | 208.7 | 4.004 |
| 64 | 750.4 | 1.292 | 191.6 | 5.060 |
| 73 | 918.5 | 1.202 | 168.7 | 6.545 |
| 82 | 1077 | 1.149 | 146.7 | 8.444 |
| 91 | 1230 | 1.116 | 128.0 | 10.72 |

From these results it is seen the Example I compositions exhibits a decrease in viscosity with shear rate while the viscosity of the Comparison composition increases on shearing and in consequence as the shear stress rises the shear rate eventually declines. This thickening of the Comparison would give difficulties in application of the composition to paper surfaces whereas the Example I composition could be applied without difficulty to a paper surface.

EXAMPLE II

This example describes the preparation and use of a copolymer latex having the composition by weight of:

| vinyl acetate | 76.9% |
|---|---|
| butyl acrylate | 22% |
| vinyl tris methoxyethoxysilane | 1.1% |

A surfactant solution comprising a 37% aq solution of Emcol K8300 (13 g), 31% aq solution of Aerosol A102 (2.5 g) and potassium persulphate (0.6 g) dissolved in distilled water (140 g) was charged to a 1 liter glass reactor, purge twice with nitrogen and hear to 75° C. with stirring. A monomer mix comprising

| vinyl acetate | 175 g |
|---|---|
| butyl acrylate | 50 g |
| silane A172 | 2.5 g | had been previously prepared and 10% was added to the reactor when the temperature reached 60° to 65° C. The reactor temperature was held at 75° C. for 45 minutes.

Then a potassium persulphate solution (persulphate 0.5 g in distilled water 30 g) was added continously over a 5 hours period and the remaining 90% of the monomer mix added over 4.5 hours. After completion of all additions the reaction was held at 75° for 30 minutes and the contents of the reactor cooled to 40° C. before adding a mixture of nonylphenol 35EO (5 g) with distilled water (20 g).

Ammonia solution was added to bring the pH of the solution to the range 6.5 to 7.5. The product had a solids content of 54%.

A comparison emulsion was also prepared in which Aerosol A102 was replaced by Arylan SC15; the latter did not satisfy the surfactant A definition.

Paper coating compositions containing the Example II emulsion and comparison emulsion, each 12 parts per hundred on clay (dry/dry), were prepared with final solids content of 45%. Example II composition had a dry pick value of 245 cms/sec and the comparison composition a dry pick value of 107 cms/sec.

EXAMPLE III

This example describes the preparation and use of a copolymer latex having the composition by weight of:

| vinyl acetate | 99.0% |
|---|---|
| ethyl hydrogen maleate | 1.0% |

A surfactant solution comprising a 37% aq solution of Emcol K8300 (13 g), 31% aq solution of Aerosol A102 (4 g) and ammonium persulphate (0.8 g) dissolved in distilled water (240 g) was charged to a 1 with stirring. Vinyl acetate (25 g) was added to the reactor when the temperature reached 60° C. to 65° C. The reaction temperature was held at 75° C. for 45 minutes.

Then an ammonium persulphate solution (persulphate 0.25 g in distilled water 20 g) was added continuously over a 5 hours period and a previously prepared monomer mix comprising:

| vinyl acetate | 225 g |
|---|---|
| ethyl hydrogen maleate | 2.5 g | added over 4.5 hours. After completion of all additions the reaction was held at 75° for 30 minutes and the contents of the reactor cooled to 40° C. before adding a mixture of nonylphenol 35EO (4.4 g) with distilled water (22.5 g).

Ammonia solution was added to bring the pH solution to the range 6.5 to 7.5. The product had a solids content of 47%.

A comparison emulsion was prepared in the same manner as Example II and paper coating compositions prepared to the same formula as Example II. The Example III composition had a dry pick value of 106 cms/sec and the comparison composition had a dry pick value of 63 cms/sec.

Thus Examples II and III demonstrate the benefit obtained with the use of surfactant A.

We claim:

1. A copolymer emulsion latex having a solids content of 20% to 70% by weight wherein vinyl C1 to C13 alkanoate forms at least about 40% by weight of the monomer charge characterised in that the polymerisation is performed in the presence of an effective amount of stabilising system comprising:
    A) at least one surfactant capable of providing sharp nucleation in the polymerisation process and
    B) at least one unsaturated surfactant including a C14 to C20 unsaturated alkenylene moiety.

2. A copolymer emulsion latex according to claim 1 wherein the stabilising surfactant system is present in an amount of from about 1% to about 10% by weight, relative to the copolymerisable monomers.

3. A copolymer emulsion according to claim 1 or 2 wherein the surfactants A and B are present in a weight ratio of from 5:1 to 1:5.

4. A pigmented paper coating composition comprising
   a) at least one pigment and
   b) an aqueous synthetic polymer latex binder according to claim 1, 2 or 3.

5. A copolymer emulsion latex according to claim 1 wherein the solids content is 40% to 60% and the stabilising surfactant system is present in an amount of from 2% to 8% by weight.

6. A copolymer emulsion latex according to claim 5 wherein surfactant A is the disodium salt of an ethoxylated alcohol half ester of sulphosuccinic acid and surfactant B is selected from oleyl propanol amide sulphosuccinate and the potassium salt of the sulphonated oleic acid.

7. A copolymer emulsion latex according to claim 1 wherein the unsaturated alkylene surfactant is selected from oleyl propanol amide sulphosuccinate and the potassium salt of the sulphonation product of oleic acid.

* * * * *